UNITED STATES PATENT OFFICE.

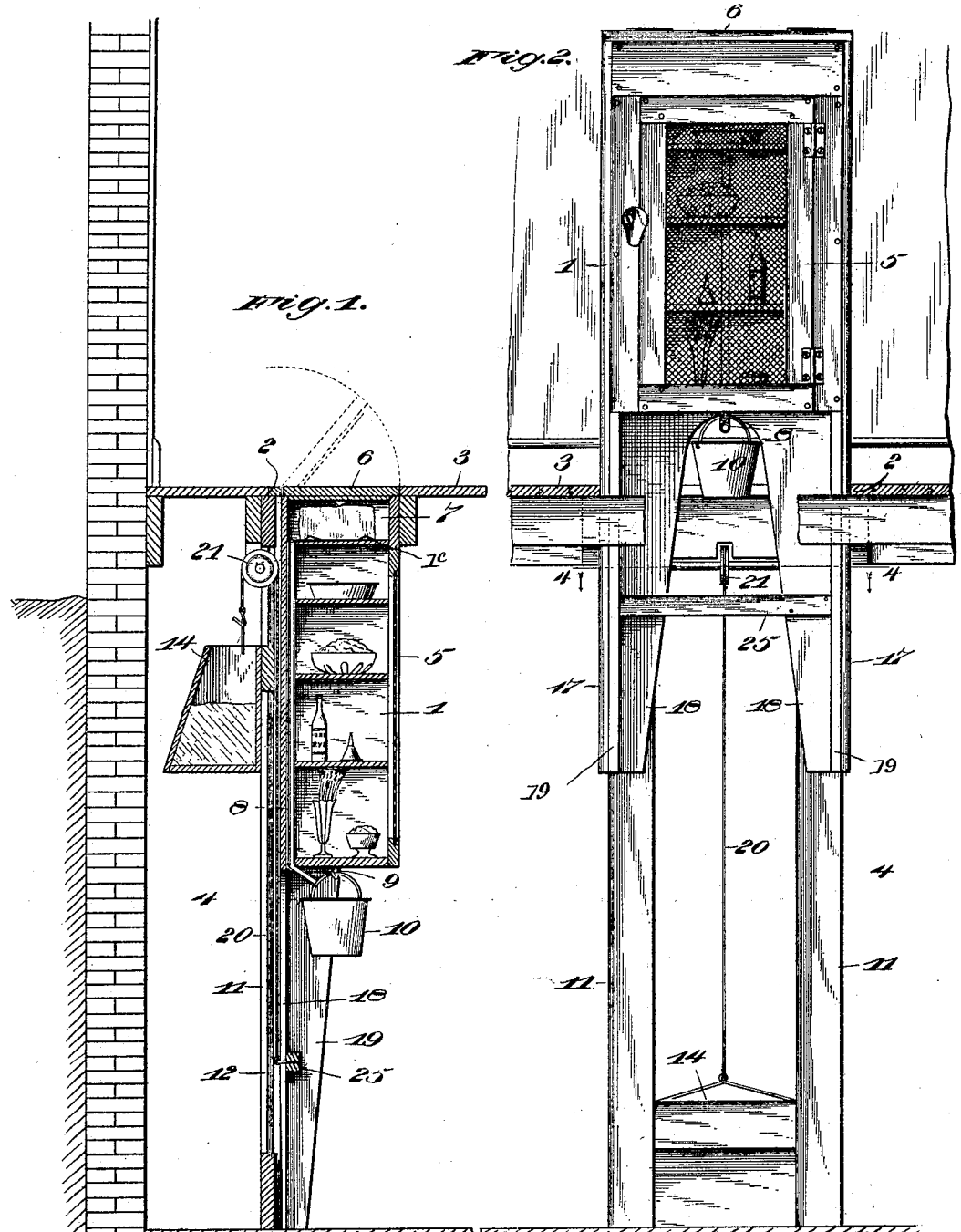

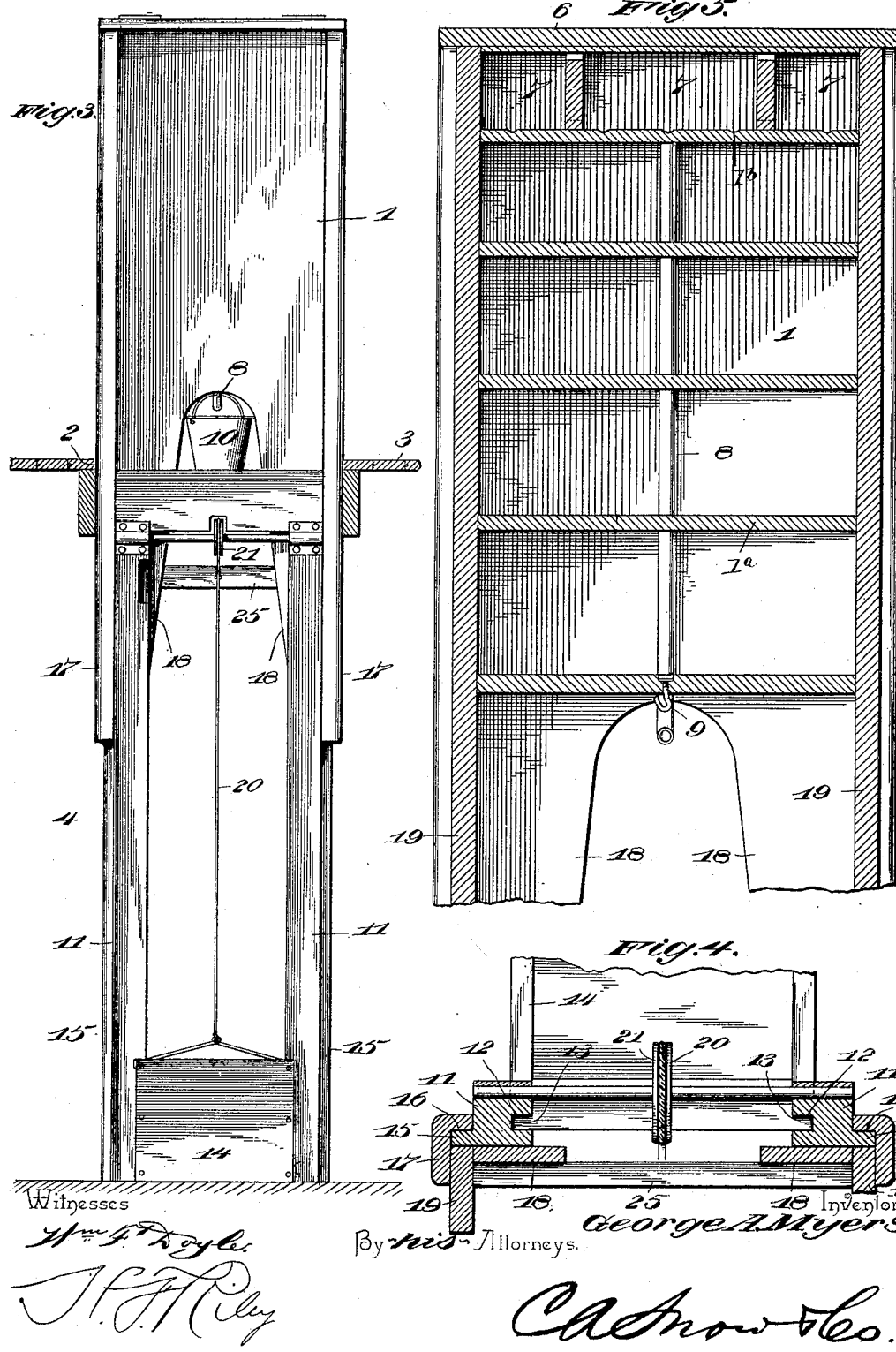

GEORGE A. MYERS, OF SOUTH HAVEN, MICHIGAN, ASSIGNOR OF ONE-HALF TO SAMUEL R. BOURMAN, OF SAME PLACE.

REFRIGERATOR.

SPECIFICATION forming part of Letters Patent No. 627,518, dated June 27, 1899.

Application filed July 30, 1898. Serial No. 687,308. (No model.)

*To all whom it may concern:*

Be it known that I, GEORGE A. MYERS, a citizen of the United States, residing at South Haven, in the county of Van Buren and State of Michigan, have invented a new and useful Refrigerator, of which the following is a specification.

The invention relates to improvements in refrigerators.

The object of the present invention is to improve the construction of refrigerators and to provide a simple and comparatively inexpensive one designed to be normally arranged in a cellar below a kitchen and adapted to be readily brought up into the kitchen to afford access to its contents and capable of being conveniently returned to the cellar, so that it will not occupy desirable space in the kitchen and at the same time have the advantage of the low temperature of the cellar.

The invention consists in the construction and novel combination and arrangement of parts, hereinafter fully described, illustrated in the accompanying drawings, and pointed out in the claim hereto appended.

In the drawings, Figure 1 is a vertical sectional view of a refrigerator constructed in accordance with this invention shown applied to a portion of a dwelling. Fig. 2 is a front elevation, partly in section, the refrigerator being elevated. Fig. 3 is a rear elevation, partly in section. Fig. 4 is a horizontal sectional view. Fig. 5 is an enlarged sectional view of the casing.

Like numerals of reference designate corresponding parts in all the figures of the drawings.

1 designates a casing forming a combined safe and refrigerator and adapted to be moved vertically through an opening 2 of a kitchen-floor 3, whereby it may be arranged within a cellar 4, where it will be out of the way and have the advantage of the low temperature therein. The casing, which is adapted to be elevated above the kitchen-floor, as illustrated in Figs. 2 and 3 of the accompanying drawings, is provided at its front with a screen-door 5 and has a hinged top 6, which lies flush with the kitchen-floor and forms a portion of the same when the casing is lowered into the cellar. The casing is provided with a series of upper compartments 7, to which access is had by the hinged lid and which are adapted to receive a supply of ice and to contain butter and various other articles requiring a very low temperature. The lower portion of the casing, or rather that portion between the compartments 7 and the bottom of the casing, is divided by a series of shelves $1^a$ and is adapted to contain various articles of food.

The water resulting from the melting of ice is carried off through a vertical pipe 8, and the casing is provided at its bottom with a hook 9, from which is suspended a pail or receptacle 10, arranged to receive the water discharged by the pipe 8. The horizontal partition forming the bottom of the compartments 7 is provided with a series of gutters $1^b$, leading to the upper end of the pipe 8 and extending from different directions, and the vertical partitions, which separate the compartments 7, are provided with openings $1^c$ for the passage of water, so that the same may flow freely through the drain-pipe 8.

The casing is guided in its vertical movement by a frame consisting of uprights 11, extending from the floor or ground of the cellar to the kitchen-floor, provided at their inner edges with vertical grooves 12 for the reception of tongues 13 of a weight-receptacle 14 and having their outer edges rabbeted to form flanges 15, which fit in grooves 16 of side bars 17 of the casing. The guide-frame is suitably braced, and the side bars of the casing have their lower portions secured to depending arms or extensions 18 of the back of the casing and are further supported by tapering arms or extensions 19 of the sides of the casing. This construction forms ways to receive the projecting flanges of the bars 11 and provides a firm support for the casing when the same is elevated.

The weight-receptacle, which is connected with the casing by a rope 20 or other suitable flexible connection, consists of a box provided with a bail, to which one end of the rope is secured. The rope, which passes over a pulley 21, has its other end secured to a cross-bar 25, attached to the depending arms or extensions of the back of the casing. The extensions 18 and 19 of the casing form legs and rest upon the floor or bottom of the cellar, so that the top of the casing when flush with the floor is firm and solid.

The invention has the following advantages: The weight within the weight-box may be readily varied to counterbalance the weight of the casing and its contents properly, and as the water resulting from the melting of ice is received within the receptacle suspended from the bottom of the casing the melting does not affect the balance of the parts.

The construction, which is simple, strong, and durable, may be readily applied to any dwelling having a cellar, and the refrigerator does not take up any of the space of the kitchen when it is not in actual use. It may be readily manipulated to raise and lower the casing, and convenient access is had to the upper compartments without raising the same, and the friction is sufficient to retain the refrigerator at any adjustment. The grooves and the flanges at the inner and outer edges of the uprights and sides of the guide-frame form two sets of ways. The casing and the weight-receptacle are interlocked with the ways, and the weight is applied to the casing at the center thereof and will not cause the parts to bind.

Changes in the form, proportion, and minor details of construction may be resorted to without departing from the spirit or sacrificing any of the advantages of this invention.

What I claim is—

A device of the class described comprising a guide-frame designed to be mounted in a cellar adjacent to an opening of a kitchen-floor and composed of parallel sides having inner and outer ways, a centrally-arranged pulley located near the top of the frame, a vertically-movable casing adapted to extend through the opening of the kitchen-floor and provided at opposite sides with depending legs interlocked with one set of the ways of the guide-frame, said casing being arranged at the front of the frame, a sliding weight-receptacle located at the back of the guide-frame and interlocked with the other set of ways thereof, and a centrally-arranged flexible connection passing over the pulley and having its ends attached to the weight-receptacle and to the casing, substantially as described.

In testimony that I claim the foregoing as my own I have hereto affixed my signature in the presence of two witnesses.

GEORGE A. MYERS.

Witnesses:
GEO. C. MONROE,
S. B. MONROE.